July 3, 1962 M. LUBIN 3,042,806

PHOTOCELL ASSEMBLY FOR READING PUNCHED RECORDS

Filed May 6, 1958

INVENTOR
MARVIN LUBIN

BY Strauch, Nolan & Neale
ATTORNEYS 3,042,806

PHOTOCELL ASSEMBLY FOR READING PUNCHED RECORDS

Marvin Lubin, La Grange, Ill., assignor to Hupp Corporation, Cleveland, Ohio, a corporation of Virginia Filed May 6, 1958, Ser. No. 733,323
8 Claims. (Cl. 250—211)

This invention relates to photocells and more particularly to the electrode arrangement for a photoconductive body of a semiconductor material such as cadmium sulfide so that a large number of individual photocells may be closely spaced for reading punched records.

Photocells have been used for reading out information stored in digital form in punched cards and tapes in many applications. Considerable difficulty has been experienced in practice in providing an assembly of a sufficient number of photocells to simultaneously scan adjacent holes in the same row and/or to simultaneously scan adjacent rows of holes in punched cards and punched tapes of conventional types. Any satisfactory solution to the foregoing problem requires a photocell of high current conductivity which is sufficiently small to fit within the physical dimensions dictated by the size of conventional punched records and effective isolation between adjacent cells.

Photoconductive semiconductor materials such as cadmium sulfide are known to exhibit large changes in current between a dark and illuminated condition, and when illuminated are capable of conducting current in sufficient quantities because of low resistivity to be used in the input circuits of data processing equipment. A major object of the present invention, therefore, is to provide a novel photocell assembly with active regions of photoconductive material so spaced as to detect holes in punched records.

A further object of the present invention is to provide a novel electrode arrangement for a photocell adapted to detect holes in punched records that are closely spaced by providing an elongated electrode which serves as the common lead for a series of independent small electrodes with islands of photoconductive material bridging between the common electrode and the several independent electrodes.

Another object of the present invention is to provide a novel photocell adapted to read conventional punched cards which is formed of a series of modules each capable of reading one row of holes in the punched card and the number of modules corresponding to the number of rows of holes in the punched card.

Still another object of the present invention is to provide a novel holder for the photocell of the present invention which supports the islands of photoconductive material at the proper distance from the holes in the punched record to be detected and which provides mechanical protection for the cell and electrical leads extending to the outside of the holder for connection into data processing equipment.

These and other objects of the invention will become more fully apparent from the claims, and the description as it proceeds in connection with the drawings, wherein:

Figures 1, 2, 3, 4:
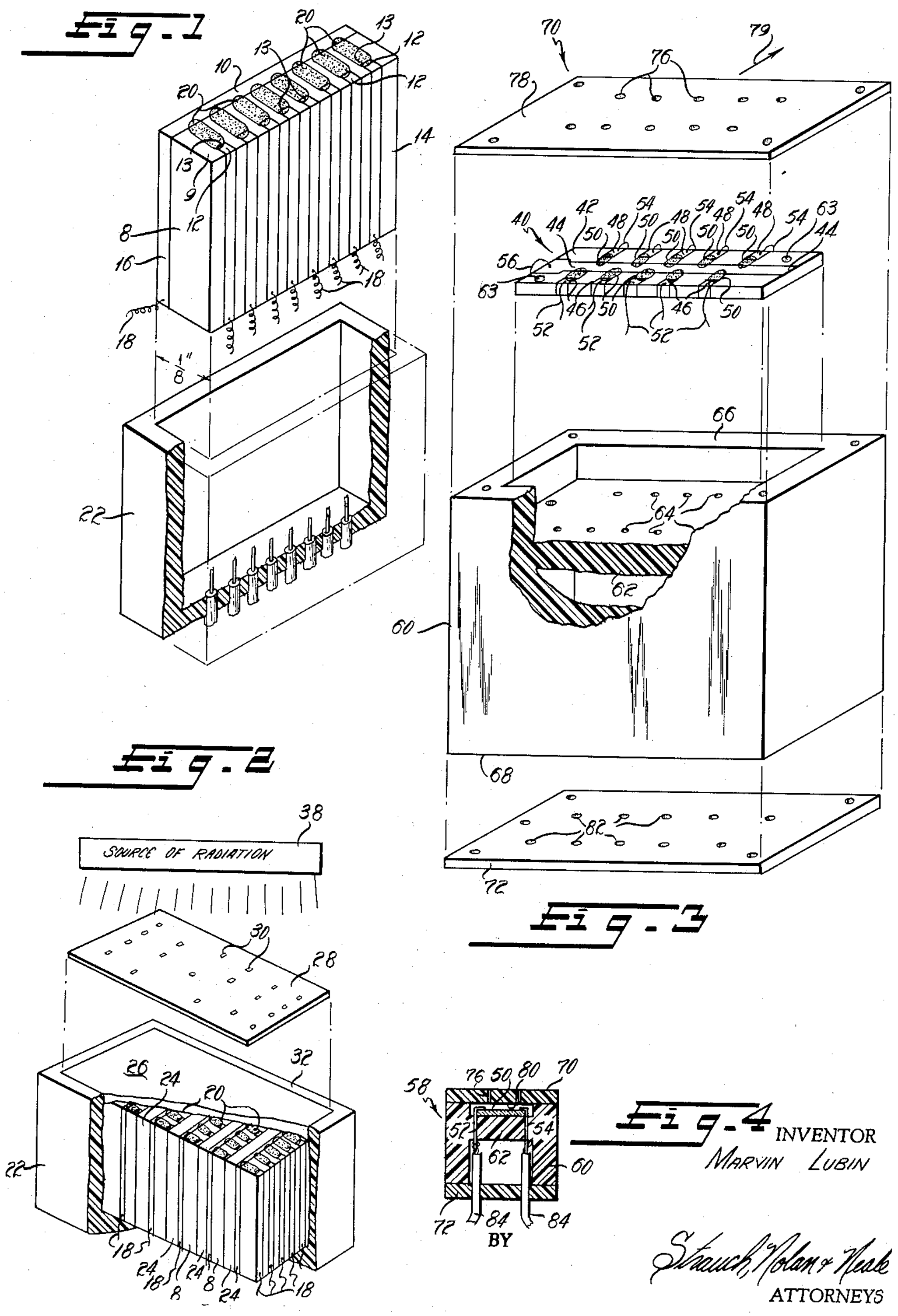
FIGURE 1 is an exploded pictorial view of one embodiment of the present invention with one end wall of the holder broken away.
FIGURE 2 is a perspective view in partial section showing a holder supporting a series of photocells as shown in FIGURE 1 for use with punched cards.
FIGURE 3 is an exploded view of a further embodiment of a photocell constructed in accordance with the present invention and specifically adapted for reading punched tape.
FIGURE 4 is an end elevation view in section of the photocell assembly of FIGURE 3.

Referring now to FIGURE 1, a photocell constructed in accordance with this invention may comprise a body 8 of a suitable insulating material which is heat resistant such as Pyrex glass and have a thickness as small as ⅛ inch. The narrow upper surface 9 is polished and an electrode 10 of a suitable conductive material such as gold or platinum is deposited thereon, such as by evaporation, to extend across the cell and cover slightly less than half the ⅛ inch dimension. A series of electrically independent electrodes 12 of the same material as electrode 10 and corresponding in number to the number of punched holes in the record to be read, are placed side by side with one edge 13 thereof spaced a small distance from the adjacent edge of electrode 10. There is no limitation on the width of the cell thereby making possible the construction of a sufficient number of electrodes side by side to read an entire line or row of holes in the punched record.

The photoconductive material is applied in the form of islands 20 which individually bridge the space between the common electrode 10 and each of the individual electrodes 12. A preferred photoconductive material is cadmium sulfide which may be evaporated through a suitable mask onto the electrodes after they are positioned on the body 8 by procedures well known to those skilled in the art, and reference is made to U.S. Patent No. 2,688,564 to Forgue for a detailed description of a suitable process.

As an alternative method of construction, the photocell may be made by applying the photoconductive material 20 as a continuous layer on the edge of body 8 and the electrodes applied to the photoconductive material. Notches are then cut into the photoconductive material by an abrasive disc or saw. However, an evaporated layer of cadmium sulfide must be sensitized by heating under carefully controlled conditions after being applied to body 8 and the further handling of the sensitized cadmium sulfide during the subsequent application of the electrodes often results in damage to the cadmium sulfide layer and therefore may cause improper electrical operation of the cell. It is for this reason preferred to first apply the electrode and then apply the evaporated layer of cadmium sulfide which is subsequently sensitized, and the use of gold or platinum as an electrode is preferable to other materials since these metals are not affected as much as others by the subsequent sensitizing treatment of the cadmium sulfide.

The principal factors to be taken into consideration in determining the minimum spacing between the electrically independent electrode sections 10 and 12 include the resistivity of the photoconductive material applied and the magnitude of the applied voltage. The electrodes must be sufficiently far apart to prevent arcing and the resistance of the photoconductive islands must be sufficiently low so that the electrical output may be used in the read-out circuits. The space is preferably kept small so the likelihood of more than one cell being illuminated through any one hole is obviated. Satisfactory operation can be achieved with an applied voltage of 30 volts D.-C. and a spacing of the order of $\frac{1}{64}$ of an inch where an evaporated layer of cadmium sulfide is used as the photoconductive material.

Any suitable electrical lead may be connected to the common electrode 10 and to the several independent electrodes 12. In this embodiment further strips of electrode material, either of the same or other suitable metal are applied as by evaporation along edge surfaces 14 and 16 on the cell body 8 to provide sufficient room for a small wire 18 to be secured thereto as with a silver cement or solder.

Body 8 when completed with the electrodes and photoconductive material is placed in a suitable holder 22 of an insulating material such as a phenolic resin. The upper surface 9 including the photoconductive material 20 is preferably encapsulated in a transparent, inert thermosetting polyester to protect the cadmium sulfide from deterioration. Typical outside dimensions for the single unit just described are 3/16 inch thick, about 3/4 inch long and about 1/2 inch high.

The type of construction described in connection with the photocell of FIGURE 1 is especially well adapted for assembly as a module in stacks or groups of any desired number so that specific types of punched records may be read. For example, if the module or wafer body 8 of FIGURE 1 is made approximately the width of the conventional punched card 28, the dots 20 of the photoconductive material may be positioned under the character or punched marks 30 in the card. The requisite number of modules or wafers 8 may be assembled in a stack so that the photocell has a length corresponding to the length of the card and the coded information on the entire punched card may be read out instantaneously or in any desired sequential manner.

FIGURE 2 shows a perspective view of a photocell assembly having a holder 22 for supporting a stack of photocells of the type described in connection with FIGURE 1. The bodies 8 are stacked adjacent each other and may be separated by insulation spacers 24 with leads 18 extending from the bottom of holder 22. A thin layer 26 of an inert transparent thermosetting material is used as a protection for the photoconductive material 20 and to provide the desired spacing of the punched card 28 from the photocells.

Punched card 28, preferably of the approximate same size as photocell assembly, is placed in an aligned position with the upper surface 32 of holder 22 and the islands 20 of the photoconductive material are individually illuminated through card 28 from a suitable source 38 in accordance with the holes punched therein.

The general formation of the electrode pattern shown in FIGURE 1 is also usable in a photocell reading head assembly for punched tape. In tape reading applications requiring only one or two rows of holes to be read at a time (each row ordinarily comprising spaces for five or more holes), the space requirements permit a cell as shown in FIGURES 3 and 4 to be used. In this embodiment the block 40 of Pyrex glass is provided with one of its larger surface areas 42 polished before applying either the photoconductive material or the electrode material. The electrode material is evaporated or otherwise applied in a suitable manner to the polished surface 42 of block 40. In the embodiment illustrated, a common single electrode 44 is applied down the center of surface 42 on block 40 and individual electrodes 46 and 48 may be applied on opposite sides of center electrode 44. It is obvious, of course, that the individual electrodes 48 on one side of center electrode 44 could be omitted with just electrodes 46 and center electrode 44 used if desired.

The photoconductive material may be evaporated through a suitable mask into the shape of islands 50 bridging between each of the individual electrodes 46 and 48 and the common electrode 44 to form a large number of individual photocells having a common electrode. A first group of fine terminal wires 52 and 54 are connected at one end to each of the independent electrodes 46 and 48, respectively, and terminal wire 56 is connected to the common electrode 44 as by a suitable silver cement or solder.

Referring now also to FIGURE 4, a housing 58 for the photocell is provided which includes a box-like central member 60 having a rigid center section 62 on which block 40 carrying the photocells is mounted. Section 62 is provided with a series of through holes 64 at positions corresponding to the position of electrode terminal wires 52, 54 and 56 so that when assembled the terminals extend through to the lower side of center section 62 as is clearly shown in FIGURE 4. Suitable guide pins (not shown) may be used with alignment apertures 63 to accurately position block 40 in housing member 60.

The four sides of central housing member 60 extend both above and below center section 62 and terminate in a generally planar upper surface 66 and lower surface 68 to which top 70 and bottom 72 are attached respectively as with suitable fasteners (no shown). Before top 70 is placed in position, the photocell is potted in a transparent inert thermosetting material to prevent contamination of the photoconductive material.

Top 70, which is formed of an opaque material such as a phenolic resin, is provided with through holes 76 corresponding in position to the location of islands 50 of photoconductive material. The size and location of holes 76 are determined by the size and location of holes used in the punched tape which is to be read since the punched tape is adapted to move across surface 78 of top 70 in the direction indicated by arrow 79.

To reduce the amount of light coming through one of the holes 76 in top 70 and to prevent such light from illuminating any island 50 of photoconductive material other than the island immediately beneath a corresponding hole, it is preferable to position the islands 50 of photoconductive material as closely as possible to the lower surface 80 of top 70 and the thickness of the potting material over the photoconductive material is very thin. Thus there is very little refraction of light to adjacent cells.

Before bottom 72 is assembled in position, external electrical conductors 84 with insulation are passed through the several holes 82 provided in bottom 72 and the ends thereof are connected electrically to the thin electrode terminals 52, 54 and 56 which are connected to the several electrodes. Bottom 72 is then secured in position to provide a rugged tape read-out assembly which is adapted to read all of the information stored in one or in two adjacent rows of punched holes.

Where it is desired to use conventional terminal boards with male and female sockets, bottom 72 may incorporate a conventional terminal board (not shown) so that the wires 52, 54 and 56 of small size which extend through apertures 64 of central section 62 may be fastened directly to the terminals in the terminal board.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination: a photoelectric cell capable of producing a controllable variable electrical current output at a plurality of electrical leads comprising a base of insulating material having a supporting surface; spaced electrodes on said surface; and individual paths of photoconductive film on said surface between said electrodes adapted to be selectively exposed to a source of light; one of said electrodes having a configuration which adjoins all the paths of photoconductive film between said electrodes; and an opaque shield over said electrodes and paths of photoconductive film; said shield having light-admitting openings therethrough with a single one of each of said light-admitting openings registering with a corresponding single path of said photoconductive film between the electrodes, each of said light-admitting openings being confined to register with a single path of said photoconductive film.

2. A photocell assembly for detecting holes in a punched record comprising in combination a holder for supporting a plurality of modules side by side with each module comprising a wafer-like base of an insulating material having large area surfaces on opposite sides and and edge surface; an elongated electrode on said edge surface of said base; a plurality of smaller electrodes on said edge surface spaced from one another by distances corresponding to the distance between adjacent holes in said punched record and equidistant from said elongated electrode; and islands of photoconductive material on said edge surface bridging said smaller electrodes to said elongated electrode, said edge surface of each base being mounted side by side in a common plane in said holder; and said smaller electrodes extending across said large area surface on one side only of said insulating material for connection to electrical terminals, the modules being mounted together with the electrode containing large area surface of one module being mounted next to the large area surface of the adjacent module not containing electrodes.

3. A photocell assembly for detecting holes in a punched record comprising in a combination: a housing having a top member of opaque material, a bottom member and an apertured central section between said bottom and top members; a body of insulating material supported on said central section carrying on its upper surface an elongated electrode and a plurality of individual electrodes disposed side by side and equidistant from said elongated electrode, islands of cadmium sulfide bridging the space from said elongated electrode to each of said individual electrodes; a first group of electrical terminals made of small sized wire connected from each of said electrodes and extending through the apertures in the central section of said housing; a second group of electrical terminals made of large sized wire connected to said first group of electrical terminals to extend outside said housing; and apertures in said opaque top member at positions corresponding to the locations of said islands of cadmium sulfide.

4. In a photocell assembly for detecting holes in a punched record, a body of heat resistant insulating material having a flat surface on one side surrounded by substantially perpendicular side walls; an elongated electrode having side edges extending along said one surface; at least five electrodes spaced side by side along an edge of said one surface, said electrodes each having a first end portion facing the side edge of said elongated electrode nearest said five electrodes and a continuation of the electrode material including another end portion disposed on one of said side walls; said first end portion of each electrode being spaced equidistant from the said nearest side edge of said elongated electrode; islands of photo-conductive material bridging the spaces between the nearest side edge of said elongated electrode and the first end portion of each of said five electrodes; electrical terminals connected to each of said electrodes; said islands being separated one from the other by a distance corresponding to the distance between the electrodes at the position where the terminals are connected to the electrodes.

5. In a photocell assembly for detecting holes in a punched record, a body of heat resistant insulating material having a flat surface on one side surrounded by substantially perpendicular side walls; an elongated central electrode having opposite parallel side edges disposed centrally along said one surface; two electrode groups each comprising at least five electrodes spaced side by side and each group being at opposite side edges of said one surface to thus be on opposite sides of said central electrode; each electrode of each group having an end portion facing the closest adjacent side of said central electrode, the said end portion of each electrode being spaced equidistant from the closest adjacent side of said central electrode; islands of photoconductive material bridging the spaces between the nearest side edge of said elongated electrode and the first end portion of each of said five electrodes; and electrical terminals connected to each of said electrodes, said islands being separated one from the other by a distance corresponding to the distance between the electrodes at the position where the terminals are connected to the electrodes.

6. A photocell assembly for detecting holes in a punched record comprising a housing having four side walls forming an enclosure; a support member mounted to said walls across said enclosure; a plate like body of insulating member positioned on one side of said support member and having a first surface and a second surface angularly related to said first surface; an elongated electrode having side edges extending along the first surface of said body of insulating material; at least five electrodes spaced side by side along an edge of said first surface, said electrodes each having a first end portion facing the side edge of said elongated electrode nearest said five electrodes and a continuation of the electrode material including another end portion disposed on the second surface of said body; said first end portion of each electrode being spaced equidistant from the said nearest side edge of said elongated electrode; islands of photoconductive material bridging the spaces between the nearest side edge of said elongated electrode and the first end portion of each of said five electrodes; electrical terminals connected to each of said electrodes; and an apertured cover member mounted above said body of insulating material and secured to the housing side walls, the apertures in said cover member being in alignment with the island of photoconductive material.

7. The photocell assembly as defined in claim 6 wherein the support member is provided with a plurality of apertures through which said electrical terminals are mounted to extend out the side of said housing opposite the side having the cover member.

8. The photocell assembly as defined in claim 7 further having an apertured lower plate secured to the side of the housing side walls opposite the side having the cover member and the electrical terminals are mounted in the apertures of said lower plate to extend to the outside of said housing.

References Cited in the file of this patent

UNITED STATES PATENTS

| | | |
|---|---|---|
| 1,880,289 | Sukumlyn | Oct. 4, 1932 |
| 1,907,124 | Ruben | May 2, 1933 |
| 2,480,113 | Betzler | Aug. 30, 1949 |
| 2,507,916 | Lister | May 16, 1950 |
| 2,728,835 | Muller | Dec. 27, 1955 |
| 2,777,040 | Kazan | Jan. 8, 1957 |
| 2,839,646 | Hester | June 17, 1958 |
| 2,907,886 | Willard et al. | Oct. 6, 1959 |
| 2,923,828 | Bernath | Feb. 2, 1960 |